United States Patent [19]

Richards et al.

[11] Patent Number: 5,336,431
[45] Date of Patent: Aug. 9, 1994

[54] COMPOSITION AND METHOD FOR SULFIDE CONTROL

[75] Inventors: Bruce E. Richards, Streator; Tyrone G. Goodart, Peru; Philip A. Vella; John R. Walton, both of Ottawa, all of Ill.

[73] Assignee: Carus Corporation, Peru, Ill.

[21] Appl. No.: 971

[22] Filed: Jan. 6, 1993

Related U.S. Application Data

[62] Division of Ser. No. 903,006, Jun. 23, 1992, Pat. No. 5,200,092.

[51] Int. Cl.$^5$ .................................. C02B 1/34
[52] U.S. Cl. .................. 252/184; 210/916; 210/764; 422/5; 423/220; 423/226
[58] Field of Search .............. 252/184, 182.1; 423/220, 226; 210/764, 916; 422/5

[56] References Cited

U.S. PATENT DOCUMENTS

| | | | |
|---|---|---|---|
| 636,986 | 11/1899 | Heinen | 424/615 |
| 2,389,309 | 11/1945 | Herzmark | 252/186.21 |
| 4,007,262 | 2/1977 | Bowers | 424/76 |
| 4,021,338 | 5/1977 | Harkin | 210/759 |
| 4,108,771 | 8/1978 | Weiss | 210/916 |
| 4,377,486 | 3/1983 | Barrick et al. | 210/916 |
| 4,416,786 | 11/1983 | Knorre et al. | 210/916 |
| 4,599,179 | 7/1986 | Pincon | 210/760 |
| 4,911,843 | 3/1990 | Hunniford et al. | 210/610 |

OTHER PUBLICATIONS

Trimble, *The Solubility of Potassium Permanganate in Solutions of Potassium Sulfate of Sodium Sulfate*, XLIV J. Am. Chem. Soc. 451 (1922).
Barber et al. *Chemical Control of Hydrogen Sulfide from Anaerobic Swine Manure I. Oxidizing Agents*, 17 Can. Ag. Eng. 90 (1975).
Cheremisinoff et al. *Industrial Odor Technology Assessment* 136-144 (1925).
Cox, *Odor Control and Olfaction* Ed. Ralph B. Duclos, Pollution Sciences Publishing Company, Lynden, Wash. 85(10).
Jenneman et al. *Effect of Nitrate on Biogenic Sulfide Production*, 51 Appl. Env. Micro. 1205 (1986).
Pomeroy et al. *Progress Report on Sulfide Control Research*, XVIII Sewage Works J. 597 (1946).

*Primary Examiner*—Robert L. Stoll
*Assistant Examiner*—Valerie Fee
*Attorney, Agent, or Firm*—Fitch, Even, Tabin & Flannery

[57] ABSTRACT

This application describes a composition comprising an alkali metal permanganate and a water soluble nitrate salt and a method of controlling the sulfide content and the odor of sulfur containing waste water by adding the composition of the invention to the waste water.

13 Claims, No Drawings

COMPOSITION AND METHOD FOR SULFIDE CONTROL

This is a division of application Ser. No. 07/903,006, filed Jun. 23, 1992, now U.S. Pat. No. 5,200,092.

This application is directed to a composition and method for the control of the sulfide content and the odor of sulfide containing water. More particularly, this invention is directed to a composition comprising an alkali metal permanganate and a water soluble nitrate salt and a method of controlling the sulfide content and the odor of sulfur containing waste water by adding the composition of the invention to the waste water.

BACKGROUND

One of the problems associated with the collection and treatment of domestic sewage is the occurrence of volatile odorous substances. These odorous compounds generally contain divalent sulfur, nitrogen and/or carbonyl oxygen. Quite abundant among the odor bearing compounds are sulfides and thiols, but the most important among these is hydrogen sulfide. Because of the prominence of this compound and other sulfides as the main odor-bearing constituents in sewage, this application is directed to the control of $H_2S$ (the gaseous form) and other sulfides (the dissolved form in water) for the control of the odor and sulfide content in sulfide containing water. The terms hydrogen sulfide ($H_2S$) and other sulfides of divalent sulfur are used interchangeably.

$H_2S$ and most of the other odorous sulfur compounds result from biological activity, particularly the anaerobic decomposition of compounds containing sulfur. The most common starting materials for hydrogen sulfide ($H_2S$) is sulfate ion ($SO_4^{2-}$). In the absence of oxygen, certain bacteria such as, for example, *Desulfovibrio desulfuricans* will metabolize sulfate ion along with diverse organic matter present according to the following equation:

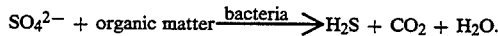

Hydrogen sulfide possesses a characteristic rotten egg odor, is toxic even in low concentrations and also highly corrosive towards steel and concrete. Its presence in air and waste water is therefore highly undesirable and its cost effective control is an important aspect of sanitary waste management.

Waste collection systems for sewage serve the purpose of conveying domestic sewage from the point of generation (for example, residences) to the treatment plant. These collection systems usually consist of many miles of concrete or iron pipe, of a wide variety of sizes. Sewage flow is effected by either gravity or the use of pumps (force mains). Hydrogen sulfide can escape from the sewage through manholes and air vents as well as via lift stations. In a sewer pipe, the actual location of bacterial action is a slimy biofilm attached to the pipe wall. Under certain conditions, bacteria present in this layer can convert sulfate ion into sulfide. Conditions favorable for sulfide generation in municipal sewage are: the presence of sulfate ion in appreciable concentrations combined with a low redox potential; the absence of dissolved oxygen and other oxidants; also the absence of nitrates and nitrites. Sulfides, however generated, are a toxicity hazard as well as an undesirable corrosive material deleterious to steel and concrete used in waste collection systems.

It is an object of the invention to control the sulfide content of sulfur containing water.

It is an object of the invention to provide a composition for the removal of odors from sulfide containing water.

It is another object of the invention to provide a method for controlling the odor of sulfide containing water.

Still further objects and advantages of the invention will be found by reference to the following description.

SUMMARY OF THE INVENTION

The invention provides a composition for the control of the sulfide content and odor of sulfur containing waste water. The composition of the invention comprises an alkali metal permanganate and a water soluble nitrate salt, the composition comprising from about 0.5 to about 95.5 weight percent permanganate and from about 0.5 to about 95.5 weight percent nitrate salt. In an important aspect of the invention, the permanganate is selected from the group consisting of potassium permanganate and sodium permanganate, and the nitrate salt is selected from the group consisting of sodium nitrate, potassium nitrate and calcium nitrate. In a particularly important aspect of the invention, the composition comprises an aqueous solution of from about 0.5 to about 10 weight percent potassium permanganate, from about 0.5 to about 42 weight percent sodium nitrate and from about 48 to about 99 weight percent water. It has been surprisingly found that the sodium nitrate enhances the water solubility of the potassium permanganate such that aqueous solutions comprising from about 4 to about 8 weight percent potassium permanganate, from about 0.5 to about 33 weight percent sodium nitrate and from about 59 to about 87.5 weight percent water can be made.

The invention also provides a method for controlling the sulfide content of and the odor of sulfur containing water. The method comprises adding an alkali metal permanganate to the water, adding a water soluble nitrate salt to the water, the permanganate and the nitrate salt being in the ratio of from about 1:1 to about 4:1 and added at a rate effective for reducing the odor of the water or the sulfide content thereof.

In an important aspect of the method, the aqueous solution of potassium permanganate and sodium nitrate, as previously described, is added to water.

DESCRIPTION OF THE PREFERRED EMBODIMENTS

Nitrates have been known to be used for the abatement of sulfide odors. Nitrates, however, have limited utility in controlling sulfides in waste water collection systems. Only where sulfide levels are very high could the use of nitrate be justified.

Nitrates do not chemically oxidize sulfide to any practical degree but their presence inhibits the microbial reduction of sulfate ion to sulfide. This is because the bacteria involved will—in the absence of oxygen—prefer nitrate over sulfate as an oxygen source for their metabolism. Thus, when the bacteria use nitrate ion instead of sulfate as hydrogen acceptor, inert, non-offensive nitrogen is formed in place of $H_2S$. However, the bacteria involved require some time for the switchover from sulfate to nitrate as an oxygen source. Usually, the "conditioning process" requires 3–5 days and during this time period the sulfide control by nitrate is relatively ineffective.

Another mode of action of the nitrate in the control of sulfide formation is by way of raising the oxidation-reduction potential of the sewage, because biological sulfide production does not occur when the redox potential is above 100 mV. However, this effect requires the presence of relatively high concentrations of nitrate.

As far as its application to collection systems is concerned, the results of a study by the United States Environmental Protection Agency, have indicated that dosages in excess of 50 ppm nitrate ions are required to reduce sulfide levels from about 14 ppm to about 1 ppm, with only about half of the nitrate actually reacting.

Potassium permanganate destroys $H_2S$ and its odor swiftly and efficiently, converting the sulfide ion into non-odorous oxidation products. The reaction between sulfide and $KMnO_4$ is sensitive to pH with regard to both the permanganate dosage required as well as the reaction products formed.

Under acidic conditions (pH$\leq$5), $H_2S$ is predominantly converted into elemental sulfur, whereas at neutral to alkaline pH's (pH 7-10) the oxidation proceeds beyond the sulfur stage to produce thionates and sulfate. Correspondingly, the required $KMnO_4$ dosage increases from about 4 parts of permanganate per part of sulfide at pH 5 to about 7 parts $KMnO_4$ at pH 9.

Simplified reaction equations can be written as follows. For acidic conditions the chemical equation is:

$$2\ MnO_4^- + 3\ H_2S \rightarrow 3S^0 + 2\ H_2O + 2\ MnO_2 + 2\ OH^-.$$

For neutral to alkaline condition the chemical equation is:

$$8\ MnO_4^- + 3\ S^{2-} + 4H_2O \rightarrow 8\ MnO_2 + 3\ SO_4^{2-} + OH^-.$$

Under neutral to alkaline conditions, the manganese dioxide ($MnO_2$) formed in the course of the permanganate reactions is also capable of reacting with sulfide; it can oxidize $H_2S$ to elemental sulfur while ultimately being converted into insoluble manganese sulfide.

$$2H_2S + MnO_2 \rightarrow S + MnS + 2H_2O$$

The permanganate reaction with sulfide is usually very fast (almost instantly) whereas the $MnO_2$-reaction will occur at a much slower rate and the latter probably accounts for the sustained control of sulfide even after all permanganate is gone.

The mode of action of the permanganate in the control of sulfide odors can be regarded as being based mostly on the oxidative destruction of the $H_2S$ formed. $KMnO_4$ may not have a lethal effect on sulfate-reducing bacteria—even though it probably retards the sulfide production by these bacteria during the first few days after addition.

While not intending to be bound by any theory, permanganate ion could (at least theoretically) suppress the formation of sulfide by raising the oxidation-reduction potential of the sewage, but because it is so rapidly consumed (see below) this effect is probably of minor practical significance.

Aside from cost, the high chemical reactivity of permanganate is another limiting factor in the use of alkali metal permanganates by themselves for odor and sulfide control in sewer lines. Because of this high reactivity, the permanganate is consumed within a few minutes after addition. Even though its control action on sulfides still continues for some time at progressively decreased efficiency, a long collection line would require a larger number of points of application for the permanganate. This would not only be inconvenient but also quite costly.

According to the invention, a combination of water soluble nitrate salt with alkali metal permanganate such as potassium or sodium permanganate, is far more effective in controlling sulfides and odor in sulfide containing water including municipal sewage than either nitrate or permanganate applied singly at comparable dosage rates. This effect is new and unexpected and provides more than double the efficiency of treatment by permanganate or nitrate by themselves.

An additional benefit resulting from the use of this invention is that the control of sulfides is effected practically instantly, due to the fast action of the permanganate salt. Thus the problem of a 3-5 day delay normally associated with the use of nitrate salt is overcome.

As used herein "water soluble nitrate salts" means a nitrate salt having a solubility of at least about 100 g of nitrate salt per liter of water.

As used herein "sulfide" means compounds which contain $S^{2-}$.

"Control of odor" means reducing an odor or eliminating an odor which is offensive to humans and which odor is caused by volatile sulfides and other volatile odorous substances.

"Control of sulfides" means preventing the production and/or destroying sulfides in water.

The composition of the invention comprises an alkali metal permanganate and a water soluble nitrate salt, the composition comprising from about 0.5 to about 95.5 weight percent permanganate and from 0.5 to about 95.5 weight percent nitrate salt. Preferably the composition comprises from about 20 to about 50 weight percent alkali metal permanganate and from about 80 to about 50 weight percent water soluble nitrate; most preferably the composition comprises 33 weight percent permanganate salt and 67 weight percent nitrate salt. Preferably the permanganate salt is potassium or sodium permanganate. Preferably the nitrate salt is selected from the group consisting of sodium nitrate, calcium nitrate and potassium nitrate.

In an important aspect of the invention, the invention is directed to an aqueous composition which comprises from about 0.5 to about 10 weight percent potassium permanganate, from about 0.5 to about 42 weight percent sodium nitrate, and from about 48 to about 99 weight percent water. In a preferred aspect, the aqueous composition comprises from about 4 to about 8 weight percent potassium permanganate, from about 8.5 to about 33 weight percent sodium nitrate and from about 59 to about 87.5 weight percent water. In the most preferred aspect the aqueous composition comprises about 5 weight percent potassium permanganate, about 10 weight percent sodium nitrate and about 85 weight percent water.

In the aqueous composition, the ratio of potassium permanganate to sodium nitrate is in the range of from about 1:1 to about 1:4. In a preferred aspect the ratio of potassium permanganate to sodium nitrate is about 1:2.

The combination of potassium permanganate and sodium nitrate surprisingly increases the solubility of the potassium permanganate. At about 25° C., under saturated conditions (where the solid phase and the dissolved phase are in equilibrium) the solubility of KMnO$_4$ is about 7.0 weight percent, based upon the weight of the entire solution. The solubility of KMnO$_4$ can be increased to about 12 weight percent, based upon the weight of the entire solution, with the addition of about 340 g/L NaNO$_3$. This increase in solubility provides a highly effective and efficient product for the control of sulfides in waste water.

The invention also contemplates a method for the control of sulfides in and for controlling the odor of sulfur containing water. The method comprises adding an alkali metal permanganate to the water, adding a water soluble nitrate salt to the water, the permanganate and the nitrate salt being in the ratio of from about 1:1 to about 1:4 (permanganate to nitrate) and added at a rate effective for reducing the odor of the water. The permanganate and nitrate are added at a rate or in an amount effective for the control of the odor of the water. Generally this rate or dosage level is a rate that is sufficient to maintain a permanganate salt to $S^{2-}$ sulfide ion concentration in the range of from about 1:1 to about 6:1, and preferably in the range of from about 2:1 to about 5:1.

In a preferred aspect the method of the invention comprises adding the previously aqueous composition of potassium permanganate and sodium nitrate to water.

Because aqueous sewage generally has a pH between about 8 to about 10, sulfides will be converted to sulfates as previously described along with the generation of MnO$_2$ which also at least partially will react with sulfides. Under acid conditions (pH$\leq$5), as opposed to basic conditions, smaller dosage levels of the composition will be required for sulfide control than would be required under basic conditions.

The following examples set forth exemplary methods of making the composition of the invention and practicing the method of the invention.

EXAMPLE 1

An approximate 50 liter sample of primary influent (following grit removal) was collected fresh from a municipal waste water treatment plant in Illinois. The sample was kept agitated at 500 rpm.

Six 6-liter portions were transferred from the above stock solution into separate containers and a nitrogen stream was bubbled for 45 minutes through the waste water samples while they were agitated at about 430 rpm. The nitrogen stream served the purpose of removing any dissolved oxygen present; after the 45 minutes, the samples were blanketed with N$_2$ to eliminate the possibility of interference from atmospheric oxygen.

Each of the six samples was then treated with a measured quantity of sodium sulfide solution to provide a sulfide concentration of close to 5 ppm.

Next sodium nitrate was added to produce nitrate (NO$_3$) concentrations of 0 (control), 10, 20, 30, 40 and 50 ppm. After 5 minutes of mixing, the reaction mixtures were put into BOD bottles in such a manner that five sets of three replicate samples for each nitrate concentration were available for incubation at 25° C. for 0, 1, 2 and 3 days.

At the end of the respective incubation times, each sample was analyzed for sulfide ion, using the EPA-approved Hach methylene blue procedure. The instrument used was a Hach Dr/2000 spectrophotometer. Experimental results are shown in Table 1.

EXAMPLE 2

Using essentially the same procedure as described in Example 1, the efficiency of various permanganate concentrations for the control of sulfides was tested with a freshly taken waste water sample. The permanganate concentrations used were 0 (control), 5, 10, 10 15, 20 and 25 ppm KMnO$_4$. Incubation times were 0, 1, 2 and 3 days. Results are also reported in Table 1.

EXAMPLE 3

In this series of tests (again with a fresh waste water sample), we used combinations of nitrate and permanganate additions at the following ppm ratios: 10/5; 20/10; 30/15; 40/20; 50/25. Otherwise, the identical procedure was used as described in Example 1. For results, see Table 1.

Discussion of the Experimental Data

Sulfide data collected in the course of our experiments are shown in Table 1. These data are mathematically converted into numbers that indicate the percent control of the sulfide found in each experiment, (partially listed in Table 2) using the following formula: (lower case letters refer to columns in Table 1).

$$\% \text{ control} = \frac{b \text{ minus } c \text{ or } d \text{ or } e \text{ or } f \text{ or } g \text{ respectively}}{b} \times 100$$

The performance (expressed as % control) in selected experiments, namely:

10 ppm NO$_3$ and 5 ppm KMnO$_4$
20 ppm NO$_3$ and 10 ppm KMnO$_4$
30 ppm NO$_3$ and 15 ppm KMnO$_4$, applied separately and in combination are listed in Table 2 for comparison.

The numbers in column e of Table 2 were calculated using the following formula:

$$e = \frac{d - (a + b)}{d} \times 100$$

For day zero, the measured sulfide values are somewhat erratic (particularly for nitrate treatment) and have therefore been excluded from further consideration.

Table 2 represents evidence for the synergistic effect of combinations of NO$_3$ with KMnO$_4$ compared to each of the two agents applied separately. This can be seen by comparing column "c" (the sum of nitrate and permanganate effects when applied separately) with column "d" which refers to the performance of the combination NO$_3$+KMnO$_4$. Column "e" expresses the synergistic action as percent of the total performance.

It is interesting to note that the magnitude of the observed synergism is the highest at low concentration levels of the combinations (where this invention would be most beneficial economically) whereas this effect becomes smaller as the concentration is increased.

EXAMPLE 4

A sewage stream of 1000 gal/min contains 3 ppm of sulfide. The odor control formulation to be used contains 5% KMnO$_4$ and 10% NaNO$_3$ in aqueous solution. The dosage rates of the formulation to be applied at various KMnO$_4$: $S^{2-}$ ratios are as follows:

| Ratio KMnO$_4$: S$^{2-}$ | Dosage Rate |
|---|---|
| 1:1 | 227.1 mL/min |
| 2:1 | 454.2 mL/min |
| 3:1 | 681.3 mL/min |
| 4:1 | 908.4 mL/min |
| 5:1 | 1,135.5 mL/min |
| 6:1 | 11,362.6 mL/min |

Alternatively, the dosing rate could be controlled by an ORP (Oxidation-Reduction-Potential) monitor/controller located at a point further downstream if the sewer line. The feed rate of the formulation would be adjusted to a perdetermined ORP-value, say, for example 100 mV.

In this arrangement, the system would select its own feed rate, in accordance with the ORP value set.

TABLE 1

EXPERIMENTAL DATA
(Each sulfide value shown represents the average of three replicate tests.)

| a | b | c | d | e | f | g |
|---|---|---|---|---|---|---|
| | NITRATE TESTS (Example 1) | | | | | |
| Day | Control 0 ppm NO$_3^-$ | 10 ppm NO$_3^-$ | 20 ppm NO$_3^-$ | 30 ppm NO$_3^-$ | 40 ppm NO$_3^-$ | 50 ppm NO$_3^-$ |
| ppm S$^{2-}$ at day 0 | 4.33 | 4.97 | 5.20 | 5.10 | 5.20 | 5.10 |
| ppm S$^{2-}$ at day 1 | 5.98 | 5.60 | 5.12 | 4.94 | 3.18 | 1.88 |
| ppm S$^{2-}$ at day 2 | 9.72 | 8.04 | 7.40 | 6.82 | 5.12 | 4.43 |
| ppm S$^{2-}$ at day 3 | 13.98 | 12.31 | 11.32 | 10.03 | 6.95 | 6.84 |
| | PERMANGANATE TESTS (Example 2) | | | | | |
| Day | Control 0 ppm KMnO$_4$ | 5 ppm KMnO$_4$ | 10 ppm KMnO$_4$ | 15 ppm KMnO$_4$ | 20 ppm KMnO$_4$ | 25 ppm KMnO$_4$ |
| ppm S$^{2-}$ at day 0 | 5.32 | 4.39 | 3.31 | 3.51 | 1.85 | 0.46 |
| ppm S$^{2-}$ at day 1 | 4.83 | 3.61 | 2.75 | 1.25 | 0.56 | 0.14 |
| ppm S$^{2-}$ at day 2 | 5.52 | 5.05 | 3.79 | 2.95 | 2.54 | 0.77 |
| ppm S$^{2-}$ at day 3 | 6.23 | 5.31 | 3.88 | 3.30 | 2.51 | 1.86 |
| | TEST WITH COMBINATIONS OF NITRATE/PERMANGANATE (Example 3) | | | | | |
| Day | Control 0/0 | 10/5 | 20/10 | 30/15 | 40/20 | 50/25 |
| ppm S$^{2-}$ at day 0 | 5.03 | 3.84 | 3.48 | 2.51 | 0.92 | 0.74 |
| ppm S$^{2-}$ at day 1 | 4.43 | 0.58 | 0.11 | 0.15 | 0.04 | 0.07 |
| ppm S$^{2-}$ at day 2 | 5.60 | 2.09 | 0.74 | 0.07 | 0.05 | 0.05 |
| ppm S$^{2-}$ at day 3 | 5.54 | 3.60 | 2.03 | 0.24 | 0.02 | 0.01 |

TABLE 2

CONTROL OF SULFIDES IN WASTE WATER
(Synergism in the combined action of nitrate and KMnO$_4$.)

| | a | b | c | d | e |
|---|---|---|---|---|---|
| Control attained at day | NO$_3^-$ 10 ppm | KMnO$_4$ 5 ppm | Σ NO$_3^-$ + KMnO$_4$ | Combination 10/5 | % of Control due to synergism |
| 0 | — | 17.7% | — | 23.7% | — |
| 1 | 6.3% | 25.2% | 31.5% | 87.0% | 63.8% |
| 2 | 17.2% | 8.6% | 25.8% | 62.6% | 58.8% |
| 3 | 11.0% | 17.5% | 29.4% | 35.0% | 16.0% |
| Average | | | | | 46.2%* |
| Control attained at day | NO$_3^-$ 20 ppm | KMnO$_4$ 10 ppm | Σ NO$_3^-$ + KMnO$_4$ | Combination 20/10 | % of Control due to synergism |
| 0 | — | 37.8% | — | 30.8% | — |
| 1 | 14.4% | 43.0% | 57.4% | 97.5% | 41.1% |
| 2 | 23.8% | 31.4% | 55.2% | 86.8% | 36.5% |
| 3 | 19.0% | 37.8% | 56.8% | 63.4% | 10.4% |
| Average | | | | | 29.3%* |
| Control attained at day | NO$_3^-$ 30 ppm | KMnO$_4$ 15 ppm | Σ NO$_3^-$ + KMnO$_4$ | Combination 30/15 | % of Control due to synergism |
| 0 | 1.2% | 33.9% | 35.1% | 50.2% | 30.1%* |
| 1 | 17.3% | 74.1% | 91.4% | 96.6% | 5.4% |
| 2 | 29.8% | 46.6% | 76.4% | 98.8% | 22.7% |
| 3 | 28.2% | 46.9% | 75.1% | 95.8% | 21.6% |
| Average | | | | | 16.6%* |

*Control on day 0 is not included in averages.

What is claimed is:

1. A composition for the control of odor of sulfides in sulfide containing water, the composition comprising:
   an alkali metal permanganate and a water soluble nitrate salt, the composition comprising from about 0.5 to about 95.5 weight percent permanganate; and from about 0.5 to about 95.5 weight percent nitrate salt.

2. A composition as recited in claim 1 wherein the permanganate is selected from the group consisting of potassium permanganate and sodium permanganate.

3. A composition as recited in claim 2 wherein the nitrate salt is selected from the group consisting of sodium nitrate, potassium nitrate and calcium nitrate.

4. A composition as recited in claim 3 wherein the composition comprises from about 20 to about 50 weight percent alkali metal permanganate and from about 80 to about 50 weight percent water soluble nitrate salt.

5. A composition as recited in claim 3 wherein the composition comprises about 33 weight percent permanganate salt and about 67 weight percent nitrate salt.

6. A composition as recited in claim 1 wherein the nitrate salt is selected from the group consisting of sodium nitrate, potassium nitrate and calcium nitrate.

7. A composition as recited in claim 1 wherein the composition comprises from about 20 to about 50 weight percent alkali metal permanganate and from about 80 to about 50 weight percent water soluble nitrate salt.

8. A composition as recited in claim 1 wherein the composition comprises about 33 weight percent permanganate salt and about 67 weight percent nitrate salt.

9. An aqueous composition comprising:
from about 0.5 to about 10 weight percent potassium permanganate;
from about 0.5 to about 42 weight percent sodium nitrate; and
from about 48 to about 99 weight percent water.

10. An aqueous composition as recited in claim 9 wherein the composition comprises from about 4 to about 8 weight percent potassium permanganate, from about 8.5 to about 33 weight percent sodium nitrate and from about 59 to about 87.5 weight percent water.

11. An aqueous composition as recited in claim 9 wherein the composition comprises about 5 weight percent potassium permanganate, about 10 weight percent sodium nitrate and about 85 weight percent water.

12. An aqueous composition as recited in claim 9 or 8 wherein the ratio of potassium permanganate to sodium nitrate is in the range of from about 1:1 to about 1:4.

13. An aqueous composition as recited in claim 9 or 10 wherein the ratio of potassium permanganate to sodium nitrate is about 1:2.

* * * * *

UNITED STATES PATENT AND TRADEMARK OFFICE
CERTIFICATE OF CORRECTION

PATENT NO. : 5,336,431

DATED : Aug. 9, 1994

INVENTOR(S) : Richards, et al.

It is certified that error appears in the above-identified patent and that said Letters Patent is hereby corrected as shown below:

Column 10, line 16, change "8" to --10--.

Signed and Sealed this

Eleventh Day of October, 1994

Attest:

BRUCE LEHMAN

Attesting Officer

Commissioner of Patents and Trademarks